United States Patent
Peter et al.

(10) Patent No.: US 7,388,921 B2
(45) Date of Patent: Jun. 17, 2008

(54) METHOD FOR PROCESSING AN OFDM SIGNAL

(75) Inventors: Stefan Peter, Backnang (DE); Dietmar Schill, Winnenden (DE)

(73) Assignee: Sony Deutschland GmbH, Cologne (DE)

( * ) Notice: Subject to any disclaimer, the term of this patent is extended or adjusted under 35 U.S.C. 154(b) by 646 days.

(21) Appl. No.: 10/917,213

(22) Filed: Aug. 12, 2004

(65) Prior Publication Data

US 2005/0036564 A1 Feb. 17, 2005

(30) Foreign Application Priority Data

Aug. 14, 2003 (EP) .................. 03018476

(51) Int. Cl.
*H04L 27/28* (2006.01)
(52) U.S. Cl. ..................................... 375/260
(58) Field of Classification Search ............... 375/260, 375/261, 340, 346–350
See application file for complete search history.

(56) References Cited

U.S. PATENT DOCUMENTS

| | | | | |
|---|---|---|---|---|
| 2006/0182063 A1* | 8/2006 | Ma et al. | ..................... | 370/331 |
| 2006/0274638 A1* | 12/2006 | Walton et al. | .............. | 370/208 |
| 2007/0066259 A1* | 3/2007 | Ryan et al. | .............. | 455/234.1 |
| 2007/0174890 A1* | 7/2007 | Geile et al. | ................. | 725/129 |

FOREIGN PATENT DOCUMENTS

| | | |
|---|---|---|
| EP | 1 162 803 | 12/2001 |
| WO | WO 02 078280 | 10/2002 |

OTHER PUBLICATIONS

Classen F et al: "Synchronization Algorithms for an OFDM System for Mobile Communication" Codierung Fur Quelle, Kanal und Ubertragung. Vortrage Der Itg-Fachtagung, Munchen, Oct. 26-28, 1994, Itg Fachberichte, Berlin, Vde Verlag, DE, vol. NR. 130, 1994, pp. 105-113, XP000503783.

* cited by examiner

*Primary Examiner*—Don N Vo
(74) *Attorney, Agent, or Firm*—Oblon, Spivak, McClelland, Maier & Neustadt, P.C.

(57) ABSTRACT

When decoding an OFDM signal, frame and frequency synchronisation is necessary. The invention shows a method enabling a high accuracy for frame and frequency synchronization, which leads to a very low error rate in comparison to prior art. The inventive method for processing an OFDM (Orthogonal Frequency Division Multiplex)-signal is based on calculating (S5) a maximum of metric values ($\Lambda$) for arrangements between a reference pilot pattern (REF-PP) and a received pilot pattern (REC-PP), on determining the respective maximizing arrangement, and on determining (S7) and maximizing integer frequency ($\hat{f}_I$) and time offsets ($\hat{T}_{sy}$) for frame synchronization and/or frequency synchronization (S8) of said OFDM-signal, wherein the calculation of said metric values ($\Lambda$) is based on the evaluation of pairs (REF-PC-PAIR ($P_i(k, l)$; $P(k, l+N_j)$)) of reference pilot cells (REF-PC), the members of said pairs (REF-PC-PAIR ($P_i(k, l)$; $P(k, l+N_j)$)) corresponding to the same discrete frequency (k) and to different discrete times (l), and based on the signals ($R(k, l)$, $R(k, l+N_j)$) of corresponding received cells with respect to said discrete frequencies (k) and sad discrete times (l).

27 Claims, 6 Drawing Sheets

METHOD FOR PROCESSING AN OFDM SIGNAL

BACKGROUND OF THE INVENTION

1. Field of the Invention

The invention relates to a method for processing an OFDM (Orthogonal Frequency Division Multiplex)-signal.

2. Description of Related Art

The OFDM technique is an efficient transmission technique to cope with many channel impairments. By inserting a guard interval between OFDM symbols, inter symbol interference (ISI) can be mitigated. Nevertheless, a robust time and frequency synchronization is necessary to achieve good performance of an OFDM system in severe channels. For many OFDM systems the transmission is organized in OFDM frames, which consist of several OFDM symbols. Therefore, a robust OFDM frame synchronization method is necessary, too.

A fractional time offset can be determined by calculating the correlation of the guard interval or parts thereof with the corresponding parts at the end of an OFDM symbol. With the same method an estimate of a fractional frequency offset, can be calculated. After the determination of the fractional time offset and the fractional frequency offset, the FFT window is positioned and a FFT (Fast Fourier Transformation) is done. The result of the FFT are received cells (cf. below). However, after this pre-processing method, a coarse frequency offset in multiples of the sub-carrier spacing and the beginning of a transmission frame, i. e. an OFDM frame, needs to be determined. The coarse frequency offset in multiples of the sub-carrier spacing can also be referred to as integer frequency offset and the term integer time offset can be used in order to describe the time offset in time units of an OFDM symbol.

After the integer frequency offset and the integer time offset have been determined, a frequency offset compensation and time offset compensation of the OFDM signal is performed.

The error rate of the determination of the integer frequency offset and the integer time offset has a strong influence on the performance of an OFDM receiver, i. e. the reliability of the synchronization of an OFDM receiver.

BRIEF SUMMARY OF THE INVENTION

It is an object underlying the invention to provide a method for processing an OFDM signal which improves the synchronization performance of an OFDM-receiver.

To achieve this objective, the invention provides a method for processing an OFDM signal and a method for processing an OFDM signal. In addition, the invention provides a receiver, a signal processing system, a computer program product, and a computer readable storage medium. Further features and preferred embodiments are respectively described in the following description.

A method for processing an OFDM (Orthogonal Frequency Division Multiplex)-signal comprises the following steps: receiving an OFDM signal comprising received cells, each received cell corresponding to a discrete frequency and to a discrete time, wherein each of said received cells is a received pilot cell or a received data cell, said received pilot cells corresponding to a received pilot pattern of an OFDM frame, providing and/or generating a reference pilot pattern of reference pilot cells, each reference pilot cell corresponding to a discrete frequency and to a discrete time, generating at least one arrangement between said received pilot pattern and said reference pilot pattern, each arrangement corresponding to an integer frequency offset, i.e. an assumed integer frequency offset, and an integer time offset, i.e. an assumed integer time offset, between said received pilot pattern and said reference pilot pattern, calculating a metric value for each arrangement of said at least one arrangement, determining the maximum value of said metric values and the respective maximizing arrangement, determining a maximizing integer frequency offset and a maximizing integer time offset corresponding to the integer frequency offset and the integer time offset of the maximizing arrangement, using said maximizing integer frequency offset and/or said maximizing integer time offset for frequency offset compensation and/or time offset compensation of said OFDM signal, wherein the calculation of said metric values is based on the evaluation of groups of reference pilot cells, wherein at least two members of said groups correspond to the same discrete frequency and to different discrete times, and based on the signals of corresponding received cells with respect to said discrete frequencies and said discrete times. It should be noted that the OFDM signal is received in time domain. Then, an A/D converter generates samples from the received OFDM signal. Afterwards, a correlation in time domain of a guard interval or of parts thereof contained in said OFDM signal is done, wherein a fractional time offset and a fractional frequency offset is determined. Then, a correction of the fractional frequency offset based on the determined fractional frequency offset is performed, i. e. a frequency offset compensation in time domain is performed. Then, an FFT (Fast Fourier Transformation) window is positioned using the determined fractional time offset and an FFT is performed. The result of the FFT are said received cells.

Said received pilot pattern of said OFDM frame corresponds to a sent out pilot pattern of a sent out OFDM frame. This means, the sent out pilot pattern has been generated by a transmitter that sent out an OFDM signal. The pilot cells of the sent out pilot pattern of the sent out OFDM frame thereby have predetermined characteristic properties regarding e. g. amplitudes and phases. The phases of the sent out pilot cells are distributed in a pseudo-random way, wherein the phases and/or amplitudes re-occur after one OFDM frame. The pilot cells are thus periodic with the length of the OFDM frame. The pilot cells, also referred to as reference cells or pilots, are scattered throughout the overall time frequency patterns and are used by the receiver to estimate a channel response. This means, no extra expense is required by the invention, since the pilot cells are already contained in the OFDM signal in case of coherent OFDM-systems, i. e. when a coherent demodulation is done. Regarding the pilot pattern, it should be noted that within said pilot pattern, pilot cells occur with a predetermined pilot cell frequency distance and with a predetermined pilot cell time distance. The predetermined pilot cell frequency distance is the distance in frequency direction of two neighboring, i. e. two subsequent pilot cells within an OFDM symbol. The predetermined pilot cell time distance is the distance in time direction between two neighboring, i. e. two subsequent, pilot cells in different OFDM symbols, but at the same frequency. It should be noted, that unless otherwise stated frequency here always refers to a discrete frequency and time always refers to a discrete time. Thus, a given frequency and a given time determines the position of a cell in the time frequency pattern of cells that can be data cells or pilot cells.

With respect to the above defined method it should also be noted, that the generation of one arrangement between said received pilot pattern and said reference pilot pattern can be seen as a relative shifting between said received pilot pattern and said reference pilot pattern. The reference pilot pattern thereby corresponds to the sent out pilot pattern. The receiver of the OFDM signal knows all relevant data in order to generate said reference pilot pattern to be identical with the sent out pilot pattern. The relative shifting can mean, that said received pilot pattern is shifted or said reference pilot pattern is shifted. The reference pilot pattern may be seen as a stencil that is shifted across said received cells. In a given arrangement it is possible, that a pilot cell of said reference pilot pattern lies above, i. e. falls together, i. e. has the same time frequency values, with a received data cell. Since the sent out pilot pattern and the reference pilot pattern are identical, in this case all pilot cells of the reference pilot pattern lie above a received data cell. However, it may also be that during the shifting, i. e. within one arrangement, a pilot cell of the reference pilot pattern falls onto, i. e. lies on a received pilot cell. In this case all pilot cells of the reference pilot pattern lie above a received pilot cell.

Preferably, within the inventive method, a remaining fractional frequency error is calculated. Thereby, the calculation of said remaining fractional frequency error is based on said metric value. Since the calculation of said metric value is based on groups of reference pilot cells and based on signals of corresponding received cells, said remaining fractional frequency error can be estimated very accurately. This is mainly due to the fact that said metric value depends on more than one pilot cell. In other words, the estimation, i. e. the calculation of said remaining fractional frequency error is more accurate because the calculation is based on a plurality of reference pilot cells.

Further, said remaining fractional frequency error may be used for an adaptation of the frequency offset compensation in time domain.

It should also be noted that said metric value is a complex value in case said remaining fracational frequency error and/or said integer frequency offset is not equal to zero. In other words, if said metric value is complex, said remaining fractional frequency error can be evaluated using the phase information of said metric value.

In a preferred embodiment, said calculation of said remaining fractional frequency error is based on the formula $$\hat{f}_f = \frac{-1}{T_s \cdot N_l \cdot 2\pi} \cdot \angle \left\{ \Lambda \cdot e^{+j2\pi \cdot \hat{f}_I \cdot N_l \cdot T_g / T_u} \right\}$$

wherein $\Lambda$ denotes said metric value, $T_s$ denotes the length of time of an OFDM symbol, $N_l$ denotes a predetermined pilot cell time difference, which is the time distance between two neighbouring reference pilot cells of said reference pilot pattern in time direction, $\hat{f}_I$ denotes said integer frequency offset, $T_g$ denotes the length of time of a guard interval of said OFDM symbol, $T_u$ denotes length of time of a useful part of said OFDM symbol, $\angle\{z\}$ denotes the angle of the complex number z.

Preferably, said groups are pairs of reference pilot cells, the members of said pairs corresponding to the same discrete frequency and to different discrete times. In other words, a group preferably contains two reference pilot cells of said reference pilot pattern, which two reference pilot cells correspond to the same discrete frequency and to different discrete times.

Preferably, said first and second members of said pairs are in each case separated by a predetermined pilot cell time distance. In other words, the reference pilot cells of a pair correspond to two neighbouring, i. e. subsequent pilot cells in time direction within said reference pilot pattern.

As mentioned, the calculation of said metric values is preferably based on the evaluation of pairs of reference pilot cells and on the signals of corresponding received cells. This means, during the calculation of said metric values, two reference pilot cells of said reference pilot pattern and the signals corresponding to received cells, which signals fall together with the reference pilot cells during the shifting, i. e. within one arrangement, are used. The two chosen reference pilot cells, i. e. a pair of reference pilot cells, correspond to the same frequency and to different times. If the calculation of said metric values is based on correlation (cf. below), an idea of the invention may be described as correlation of the received signal with the known pilot amplitude and phases in time direction. As the changes of the channel in time direction, e. g. in DRM related to the spacing of the pilot cells, are generally very small in comparison to changes of the channel in frequency direction, the correlation in time direction delivers much more robust results. As will be shown below, the probability for a wrong synchronization decreases by a factor of up to 100 when the signal is transmitted over strong fading channels.

The invention also provides a second method for processing an OFDM (orthogonal frequency division multiplex) signal comprising the steps of receiving an OFDM signal, i. e. a transmitted OFDM signal, comprising received cells, each received cell corresponding to a discrete frequency and to a discrete time, wherein each of said received cells is a received pilot cell or a received data cell, said received pilot cells, also referred to as reference cells or pilots, corresponding to a received pilot pattern of an OFDM frame, providing and/or generating a reference pilot pattern of reference pilot cells, each reference pilot cell corresponding to a discrete frequency and to a discrete time, receiving, providing and/or computing an integer frequency offset and an integer time offset, receiving, providing and/or computing a metric value based on said received pilot pattern and said reference pilot pattern, which metric value depends on said integer frequency offset and said integer time offset between said received pilot pattern and said reference pilot pattern, and calculating a remaining fractional frequency error, wherein the calculation of said remaining fractional frequency error is based on said metric value. Regarding the second method it should be noted, that the metric value does not need to be computed for several arrangements. Instead it is only computed for one arrangement corresponding to said integer frequency offset and said integer time offset. This integer frequency offset and integer time offset may be calculated with the first method defined above or with any other prior method.

Within said second method said remaining fractional frequency error may be used for an adaptation of a frequency offset compensation in time domain as explained above. This means, the remaining fractional frequency error is used in time domain, i. e. before the FFT is performed, in order to improve the frequency offset compensation in time domain.

Further, within said second method, said metric value is preferably a complex value, in case said remaining fractional frequency error and/or said integer frequency offset is not equal to zero. In other words, said remaining fractional frequency error is estimated using the phase information of said metric value.

In a preferred embodiment of the second method, said calculation of said remaining fractional frequency error is based on the following formula $$\hat{f}_f = \frac{-1}{T_s \cdot N_l \cdot 2\pi} \cdot L\left\{\Lambda \cdot e^{+j2\pi \cdot \hat{f}_I \cdot N_l \cdot T_g / T_u}\right\} \quad (8)$$

wherein
- $\Lambda$ denotes said metric value,
- $T_s$ denotes the length of time of an OFDM symbol,
- $N_l$ denotes a predetermined pilot cell time difference, which is the time distance between two neighbouring reference pilot cells of said reference pilot pattern in time direction,
- $\hat{f}_I$ denotes said integer frequency offset,
- $T_g$ denotes the length of time of a guard interval of said OFDM symbol,
- $T_u$ denotes length of time of a useful part of said OFDM symbol, and
- $L\{z\}$ denotes the argument, i. e. the angle, of the complex number z.

Preferably, said calculation of said metric values is based on correlation techniques. The correlation is thereby performed in frequency domain, and on said received cells, i. e. corresponding signals of said received cells, and is based on said reference pilot cells.

Further, said calculation of said metric values is based on products of said corresponding signals of received cells and/or its conjugate complex values. The use of the conjugate complex values ensures a real value of said metric value.

Also, said calculation of said metric values can be based on products of exponential values of phase differences of reference pilot cells of said groups. As mentioned, preferably said group comprises two reference pilot cells and the said calculation of said metric values is based on products of exponential values of the phase difference between these two reference pilot cells.

Further, said calculation of said metric values is preferably based on a process of summation over at least two groups of reference pilot cells within said reference pilot pattern. If the calculation is based on correlation techniques, this means that at least two correlation results are summed to obtain said metric values.

Further, said calculation of said metric values may be based on a process of summation over selected groups of reference pilot cells within said reference, pilot pattern, which groups are selected according to a selection criterion.

Thereby, said selection criterion e. g. assures that only groups are chosen containing reference pilot cells of said reference pilot pattern which reference pilot cells correspond to received cells that have been received before a certain discrete time. This has the advantage, that not all correlations corresponding to a complete reference pilot pattern need to be calculated, but only selected correlations. Thereby, less memory is required and a synchronization of said OFDM signal may be performed faster, because it is not necessary to wait until a complete OFDM frame is received. In other words, the calculation of said metric values is started, before a complete OFDM frame is received.

Said selection criterion may also assure that only groups are chosen containing reference pilot cells of said reference pilot pattern, which reference pilot cells correspond to received cells that correspond to discrete frequencies, at which a transmission channel has good transmission properties. Thereby, said received OFDM signal has been transmitted over this transmission channel. According to this selection criterion the correlation is only calculated for received cells at frequencies where the transmission channel has e. g. no fading or other distortions. The determination of frequencies at which e. g. fading in the transmission channel exists, may be determined by random selection. This means, that different selection criterions yielding different groups of reference pilot cells of said reference pilot pattern are chosen randomly and the selection criterion with the best result is chosen. This assumes, that the best result is obtained, when only groups are selected that correspond to received cells at frequencies where no fading of the transmission channel exists. It can also be helpful to use different weighting factors, weighing the influence of said corresponding signals of received cells. Thereby, said corresponding signals of received cells and/or its conjugate complex values corresponding to frequencies at which no fading exists, are weighted with a higher weight than other corresponding signals of received cells and/or its conjugate complex values having frequencies where fading is prevalent.

Further, said calculation of said metric values may be based on a process of summation over all groups of reference pilot cells within said reference pilot pattern. The group of reference pilot cells thus may be seen as subset of said reference pilot pattern, which subset is shifted across the reference pilot pattern, thereby covering all pilot cells of said reference pilot pattern. If said metric is based on a correlation, said process of summation over all pairs of reference pilot cells within said reference pilot pattern may be seen as summing-up all contributions of correlations between said reference pilot cells of a pair and the signals of corresponding received cells, i. e. the received cells that fall together with the positions of the pilot cells of said pair.

Said metric value may be calculated by using the formula $$\Lambda = \sum_{\forall (k,l) \in \Gamma} R(k,l) \cdot R^*(k, l+N_l) \cdot \exp(j \cdot 2\pi \cdot (L\{P(k, l+N_l)\} - L\{P(k,l)\})) \quad (1)$$

wherein
- R(k, l) denotes a signal of a received cell at discrete frequency k and discrete time l,
- R*(k, l+$N_l$) denotes a conjugate complex signal corresponding to a signal of a received cell at discrete frequency k and discrete time (l+$N_l$), i. e. the frequency of the received cell is the same as for the received cell corresponding to the signal R(k, l) and the time is different than for the received cell corresponding to the signal R(k, l),
- P(k, l) denotes a signal of reference pilot cell at discrete frequency k and discrete time l,
- P(k, l+$N_l$) denotes a signal of reference pilot cell at discrete frequency k and discrete time (l+$N_l$), i. e. the frequency of the reference pilot cell is the same as for the reference pilot cell P(k, l) and the time is different than for the reference pilot cell P(k, l)
- $\Gamma$ is the set of couples (k, l) of all discrete frequencies and all discrete times of said reference pilot pattern,
- $L\{z\}$ denotes the angle of the complex number z, and
- $N_l$ denotes the predetermined pilot cell time difference.

In equation (1), the signal of a received cell R(k, l) is correlated with a signal of a received pilot cell P(k, l) at the same discrete frequency k and the same discrete time l. As can be seen from equation (1), the calculation is based on a pair of reference pilot cells, i. e. P(k, l+$N_l$) and P(k, l), which reference pilot cells are neighbouring reference pilot cells in said reference pilot pattern in time direction. Eq. (1) preferably is evaluated for all possible values of k, i. e. ∀k, and for times l with l∈{0, 1 . . . , ($N_{sy}$–1–$N_l$)}.

Said metric value may also be calculated by using the formula $$\Lambda(x, y) = \sum_{\forall (k-x, (l-y) \bmod N_{sy}) \in \Gamma} [R(k, l) \cdot R^*(k, l+N_l) \cdot \quad (3)$$

$$\exp(j \cdot 2\pi \cdot (\angle\{P(k-x, (l+N_l-y) \bmod N_{sy})\} -$$

$$\angle\{P(k-x, (l-y) \bmod N_{sy})\}))]$$

In Eq. (3)

R(k, l) denotes a signal of a received cell at discrete frequency k and discrete time l, R*(k, l+$N_l$) denotes a conjugate complex signal corresponding to a signal of a received cell at discrete frequency k and discrete time (l+$N_l$)

P(k, l) denotes a signal of reference pilot cell at discrete frequency k and discrete time l, P(k, l+$N_l$) denotes a signal of reference pilot cell at discrete frequency k and discrete time (l+$N_l$), Γ is the set of couples (k, l) of all discrete frequencies and all discrete times of said reference pilot pattern, ∠{z} denotes the angle of the complex number z, $N_l$ denotes the predetermined pilot cell time difference, x denotes said integer frequency offset between said received pilot pattern (REC-PP) and said reference pilot pattern (REF-PP), y denotes said integer time offset between said received pilot pattern (REC-PP) and said reference pilot pattern (REF-PP), and mod denotes the modulo operator.

It should be noted that Eq. (3) can be derived from Eq. (1) or vice versa. Eq. (1) is equal to Eq. (3) if there is no integer frequency offset and no integer time offset between said received pilot pattern and said reference pilot pattern, i.e. Λ=Λ(x=0, y=0).

In a preferred embodiment, said received OFDM signal is subjected to a pre-processing method, wherein a fractional frequency offset and a fractional time offset is determined. This means, the synchronization acquisition, i. e. the synchronization of an OFDM system performing the above defined steps, can be subdivided into two parts: Firstly, the frequency offset in fractions of the sub-carrier spacing, i. e. said fractional frequency offset, and a time offset in fractions of the symbol timing, i. e. said fractional time offset are estimated in the time domain, i. e. before a Fast Fourier Transformation (FFT) is performed. The fractional time offset and the fractional frequency offset are determined by a correlation in the time domain. The fractional time offset is used in order to position the FFT window properly. The fractional frequency offset is used for compensating a fractional frequency offset in time domain. Then, the Fast Fourier Transformation is performed, the result being received cells. Secondly, the frequency offset in multiples of the sub-carrier spacing, i. e. said integer frequency offset and the timing offset in multiples of said OFDM symbols, i. e. said integer time offset, indicating the start of an OFDM frame, are estimated in the frequency domain, i. e. after the FFT.

Preferably, said pre-processing method is based on an auto-correlation of said received OFDM signal in the time domain. Thereby a guard interval of said OFDM signal is evaluated.

Preferably, said received pilot cells correspond to boosted pilot cells. This means, a boosting factor, e. g. of √2 may be used. The use of said boosting factor has the effect that the boosted pilot cells have a higher energy in comparison to data cells. This leads to an improved detection of said integer time offset and said integer frequency offset, because the result of the correlation takes on a higher value.

An inventive receiver is capable of performing or realizing a method for processing an OFDM signal as defined above. Said receiver may e. g. be a Digital Radio Mondiale (DRM) receiver, a Digital Video Broadcasting-Terestrial (DVB-T) receiver, an Integrated Services Digital Broadcasting-Terestrial (ISDB-T) receiver, and/or the like. In other words, the above defined method may be advantageously used in DRM, DVB-T and/or ISDB-T. In general, the above defined method may be used in any coherent OFDM system.

An inventive signal processing system is capable of performing or realizing a method for processing an OFDM-signal as defined above.

Said inventive signal processing system may be based on an application-specific integrated circuit (ASIC), a field-programmable gate array (FPGA), and/or the like.

An inventive computer program product comprises computer program means adapted to perform and/or to realize above defined method for processing an OFDM signal, when it is executed on a computer, a digital signal processing means, and/or the like.

An inventive computer readable storage medium comprises a computer program product as defined above.

The invention and advantageous details thereof will be explained by way of an exemplary embodiment thereof in the following with reference to the accompanying drawings, in which

DETAILED DESCRIPTION OF THE INVENTION

Figure 1:
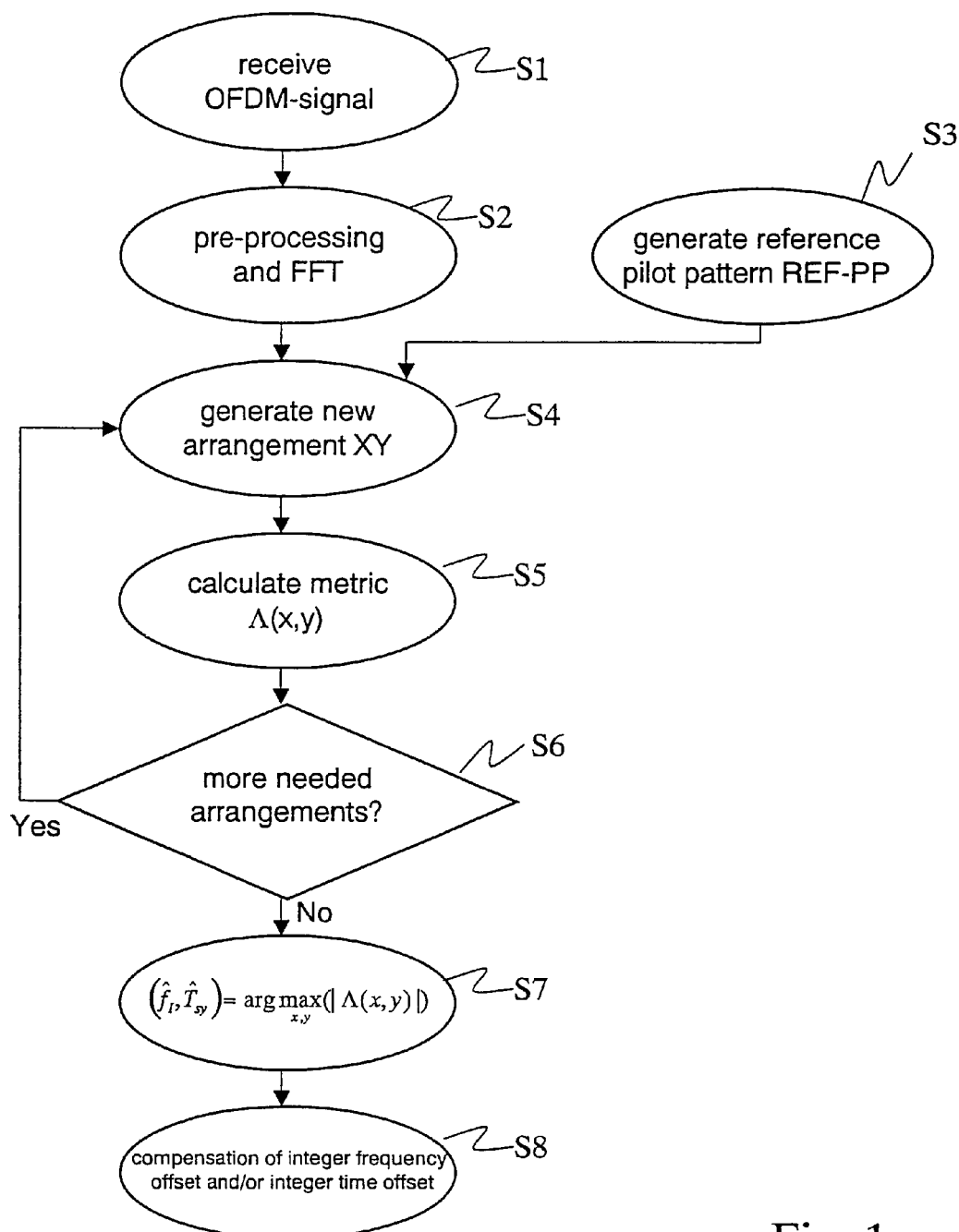
FIG. 1 shows a block diagram comprising the main steps of the invention.

In FIG. 1, in a receiving step S1, an OFDM signal is received in time domain. In a following pre-processing step 2, a correlation of a guard interval or parts thereof with corresponding parts at the end of the OFDM symbol contained in said OFDM signal is calculated. This way a fractional time offset and a fractional frequency offset is determined. The fractional frequency offset is used in order to correct, i. e. to compensate a fractional frequency offset of said OFDM signal in time domain. Then, still in the pre-processing step S2, a FFT window is positioned using the determined fractional time offset and a FFT (Fast Fourier Transformation) is done. The result of the FFT are received cells, which received cells can be received pilot cells REC-PC or received data cells REC-DC. At this time, it is not yet known which received cells are received pilot cells REC-PC and which received cells are received data cells REC-DC. However, it should be noted that within the received cells, a received pilot pattern REC-PP is contained.

In a reference pilot pattern generation step S3 a reference pilot pattern REF-PP is generated. This reference pilot pattern REF-PP corresponds to a sent pilot pattern S-PP that was sent out by a transmitter of the OFDM signal.

In a following arrangement generating step S4 an arrangement XY of said received pilot pattern REC-PP and said reference pilot pattern REF-PP is generated, corresponding to an offset x between the received pilot pattern REC-PP and the reference pilot pattern REF-PP in frequency direction, and an offset y between the received pilot pattern REC-PP and the reference pilot pattern REF-PP in time direction. In other words, the frequency-time-position x, y corresponds to a frequency-time-offset between the received pilot pattern REC-PP and the reference pilot pattern REF-PP. One arrangement x, y may also be seen as a trial position.

In a first calculation step S5 a metric value $\Lambda(x, y)$ is calculated for the arrangement XY. In a loop exiting step S6, it is determined whether a further arrangement XY is generated, i. e. the arrangement generating step S4 and the first calculation step S5 are repeated under certain conditions. This may be determined by choosing all positions (x, y), wherein $x \in \{-k_{offset}, \ldots, 0, \ldots, +k_{offset}\}$ and $y \in \{0, 1, \ldots, (N_{sy}-1)\}$. The range of the values from which x is chosen determines a frequency offset range that can be determined. If, e. g. the sub-carrier spacing is equal to 50 Hz, and $k_{offset}=5$, then the frequency offset range that can be detected, i. e. a synchronizsation is still possible in this range, is equal to ±250 Hz. It should be noted, that in the example here, the frequency offset range is symmetric. However, it may also be possible to use a more general search range for x, e. g. $x \in \{0, \ldots, +k_{offset}\}$. In this case only positive frequency offsets may be detected. It is also possible to use search ranges such as e. g. $x \in \{-k_{offset1}, \ldots, 0, \ldots, +k_{offset2}\}$, i. e. an unsymmetric search range.

If all possible combinations of (x, y) from the above defined range of x and y have been processed, i. e. for each arrangement a metric value $\Lambda(x, y)$ has been determined, the loop of the arrangement generating step S4, the first calculation step S5 and the loop exiting step S6, is exited.

After the loop exiting step S6, a maximizing integer frequency offset $\hat{f}_I$ and a maximizing integer time offset $\hat{T}_{sy}$ are determined in an argmax step S7. In this argmax step S7, a maximum value of all metric values $\Lambda(x,y)$, $x \in \{-k_{offset}, \ldots, 0, \ldots, +k_{offset}\}$ $y \in \{0, 1, \ldots, (N_{sy}-1)\}$ is determined. This means, the maximizing integer frequency offset $\hat{f}_I$ and the maximizing integer time offset $\hat{T}_{sy}$ is determined by the following equation $$(\hat{f}_I, \hat{T}_{sy}) = \underset{x,y}{\mathrm{argmax}}(|\Lambda(x, y)|) \tag{2}$$

In a compensation step S8, the maximizing integer frequency offset $\hat{f}_I$ and the maximizing integer time offset $\hat{T}_{sy}$ are used for frequency and time offset compensation of the received OFDM signal.

Figure 2:
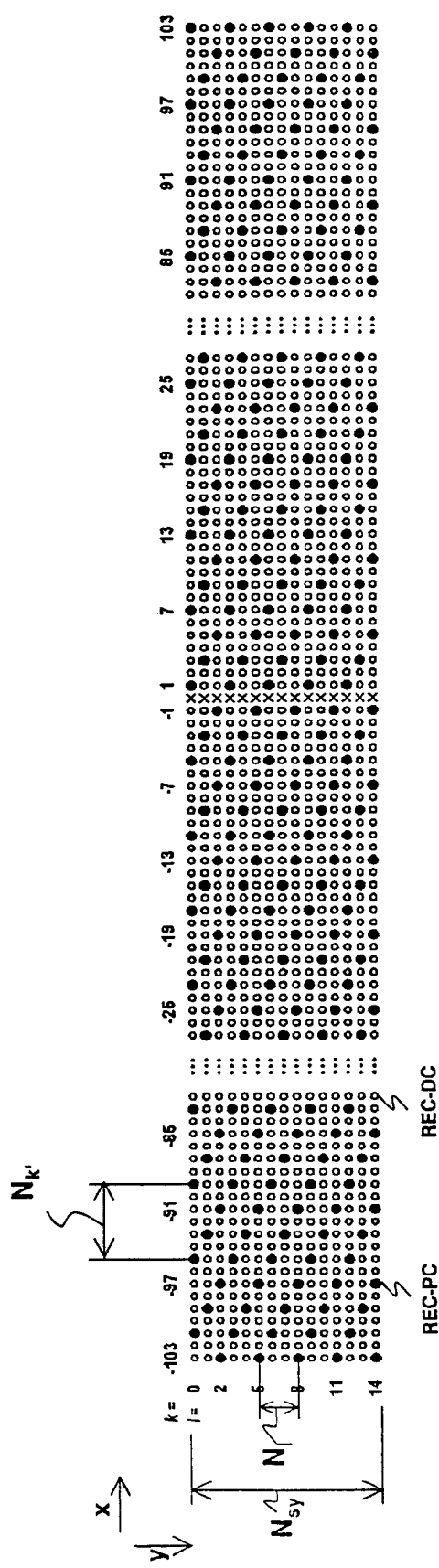
FIG. 2 shows a time frequency pattern of received cells, comprising a received pilot pattern.

FIG. 2 shows a received pilot pattern REC-PP that is built-up, i. e. formed by received pilot cells REC-PC. In FIG. 2 black dots denote received pilot cells REC-PC. FIG. 2 also shows received data cells REC-DC that are shown as small hollow circles. In time direction 1 a received pilot cell REC-PC has a predetermined pilot cell time difference $N_l$ to the next received pilot cell REC-PC in time direction. The predetermined pilot cell time difference $N_l$ may also be referred to as reference cell repetition distance in time direction. The distance between neighbouring received pilot cells REC-PC in frequency direction is a predetermined pilot cell frequency distance $N_k$, i. e. the distance in frequency direction of two neighbouring received pilot cells is equal to the predetermined pilot cell frequency distance $N_k$, which may also be referred to as reference cell repetition distance in frequency direction. It should be noted, that the terms reference cell, pilot cell and pilot, are used synonymously.

FIG. 2 shows a complete received OFDM frame comprising $N_{sy}$ OFDM symbols. The received OFDM frame may also be referred to as transmitted OFDM frame, since it has been transmitted over a transmission channel. In the example of FIG. 2 there are $N_{sy}=15$ OFDM symbols, that make up the shown OFDM frame. The phases of the pilot cells are distributed in pseudorandom way, however, the phases re-occur after one frame, i. e. the phase and amplitude of the pilot cells is periodic with the length of the OFDM frame $N_{sy}$, here $N_{sy}=15$.

As mentioned above, within the inventive method a metric value $\Lambda(x, y)$ is calculated. Assuming that the data, i. e. received cells which can be received pilot cells REC-PC or received data cells REC-DC, are received with no integer frequency offset, i. e. $f_I=0$, and with no integer time offset, i. e. $T_{sy}=0$, the metric value $\Lambda(x,y)$ may be calculated by the following equation:

$$\Lambda = \sum_{\forall (k,l) \in \Gamma} R(k, l) \cdot R^*(k, l+N_l) \cdot \exp(j \cdot 2\pi \cdot (\angle\{P(k, l+N_l)\} - \angle\{P(k, l)\})) \tag{1}$$

wherein this equation is computed for all possible values of k, i. e. $\forall k$, and for $l \in \{0, 1, \ldots, (N_{sy}-1-N_l)\}$, It should be noted that Eq. (1) is only one possibility to calculate the metric value $\Lambda(x,y)$ according to the invention. Other possibilities based on the same underlying ideas of the invention can be formulated by a person skilled in the art easily. A similar inventive metric value $\Lambda'$ may be calculated by $$\Lambda' = \sum_{\forall (k,l) \in \Gamma} R(k, l) \cdot R^*(k, l+N_l) \cdot P(k, l+N_l) \cdot P^*(k, l) \tag{1a}$$

This means the invention is based on the correlation between pilots, i. e. pilot cells, of different OFDM symbols but at the same frequency position, spaced $N_l$ time steps, i. e. symbols, here $N_l=3$, symbols a part.

In equations (1) and (1a)

R(k, l) denotes a signal of a received cell at discrete frequency k and discrete time l, R*(k, l+N$_l$) denotes a conjugate complex signal corresponding to a signal of a received cell at discrete frequency k and discrete time (l+N$_l$), i. e. the frequency of the received cell is the same as for the received cell corresponding to the signal R(k, l) and the time is different than for the received cell corresponding to the signal R(k, l), P(k, l) denotes a signal of reference pilot cell at discrete frequency k and discrete time l, P(k, l+N$_l$) denotes a signal of reference pilot cell at discrete frequency k and discrete time (l+N$_l$), i. e. the frequency of the reference pilot cell is the same as for the reference pilot cell P(k, l) and the time is different than for the reference pilot cell P(k, l)

Γ is the set of couples (k, l) of all discrete frequencies and all discrete times of said reference pilot pattern, ∠{z} denotes the argument, i. e. the angle, of the complex number z, and N$_l$ denotes the predetermined pilot cell time difference. Note that N$_l$ is an integer value which has no dimension.

Figure 3:
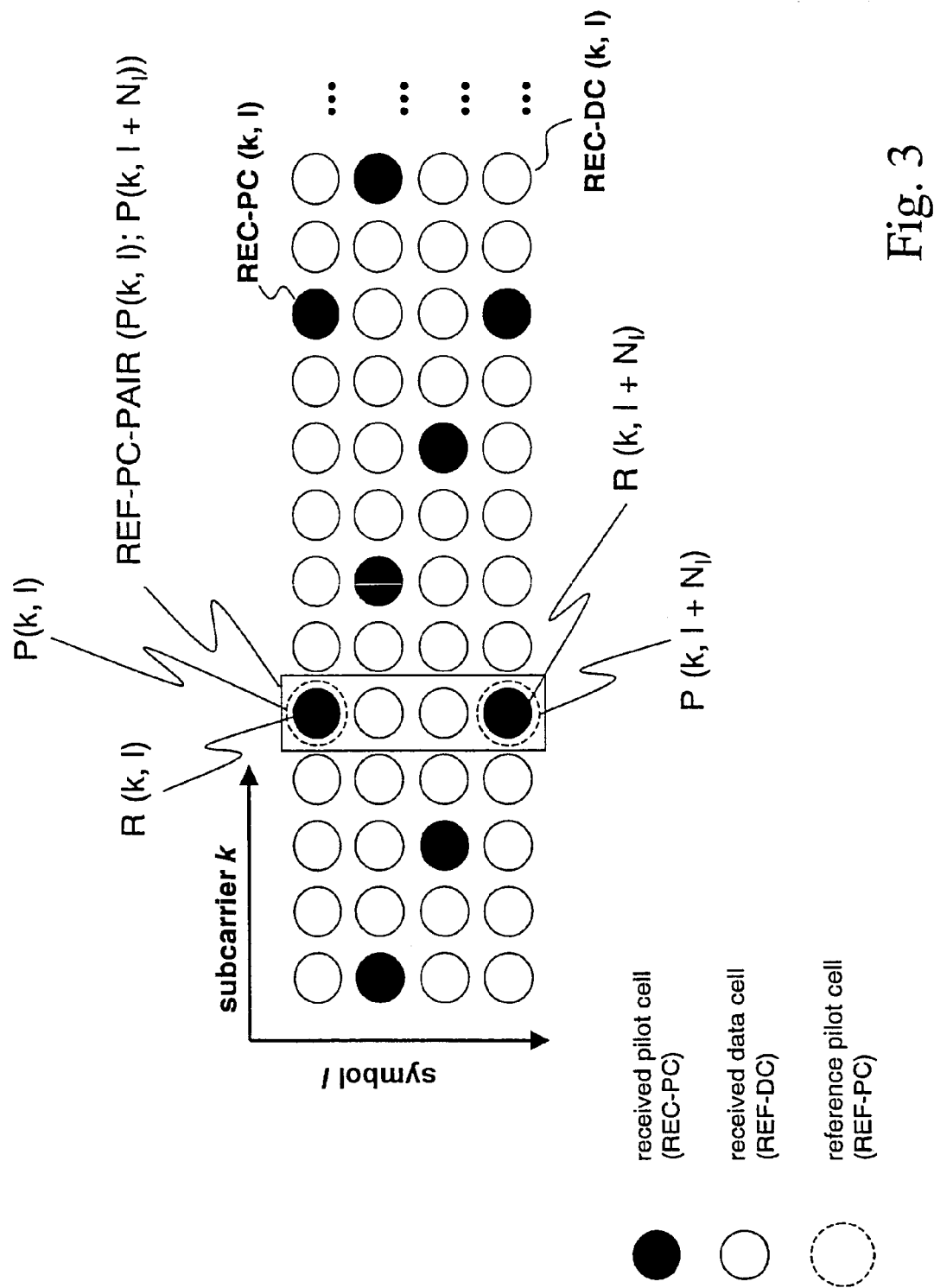
FIG. 3 shows a part of a time frequency pattern and of a reference pilot pattern in order to illustrate the calculation of the metric values.

FIG. 3 may help in understanding more clearly an important aspect of the invention. FIG. 3 shows a pair of reference pilot cells REF-PC-PAIR (P(k, l); P(k, l+N$_l$)) containing two reference pilot cells REF-PC, i. e. P (k, l) and P(k, l+N$_l$) which are located at the same frequency k but at different times l and (l+N$_l$), i. e. these two pilot cells belong to different OFDM symbols. FIG. 3 also shows a received cell R(k, l) and a received cell R(k, l+N$_l$), which correspond to received pilot cells REC-PC. Please note that for clarity reasons it is not distinguished between a received cell and a signal of a received cell, i. e. the two terms are used synonymously.

An addend of equation (1) corresponds to the correlation of the received cell R(k, l), the received cell R(k, l+N$_l$), the reference pilot cell P(k, l) and the reference pilot cell P(k, l+N$_l$) that are depicted in FIG. 3.

As mentioned above, to search for an unknown integer frequency of said f$_I$ and integer time of said T$_{sy}$, the correlation, i. e. the metric value, is computed for modified pilot positions. If, for example the received OFDM frame starts at l=1, i. e. T$_{sy}$=1 in FIG. 2, the pilot cell which was sent at (−103,2) is received at a time frequency position of (−103,3). To cope with this, the reference pilot pattern is shifted down by y symbols, here y=1. This is repeated for y between 0 and (N$_{sy}$−1). In the presence of an integer frequency offset of for example f$_I$=1, a sent out pilot cell that was sent out at time frequency position (−103,2) is now received at (−102,2), and thus the reference pilot pattern has to be shifted by x frequency position, here x=1. The values used for x determine the search range for the integer frequency offset and the values used for y determine the search range for the integer time offset. Combining the modifications of the pilot pattern for all possible combinations of x and y, i. e. determining all possible arrangements of the received pilot pattern REC-PP and the reference pilot pattern REF-PP, and computing the correlation, i. e. computing a metric value for each arrangement, produces an array of correlation results with indices x and y, i. e. Λ(x, y). With x {−k$_{offset}$, . . . , 0, . . . , +k$_{offset}$} and y ∈{0, 1, . . . , (N$_{sy}$−1)} the array of correlation results, i. e. the different metric values Λ(x, y) can be calculated with equation (3):

$$\Lambda(x, y) = \sum_{\forall (k-x,(l-y) \bmod N_{sy}) \in \Gamma} [R(k, l) \cdot R^*(k, l+N_l) \cdot \exp(j \cdot 2\pi \cdot (\angle\{P(k-x, (l+N_l-y) \bmod N_{sy})\} - \angle\{P(k-x, (l-y) \bmod N_{sy})\}))] \quad (3)$$

wherein mod denotes a modulo operation. Eq. (3) is evaluated for all values of k, i. e. ∀k, and for l∈{0, 1, . . . , (N$_{sy}$−1−N$_l$)}.

Now, the estimate for the integer frequency offset, i. e. a maximizing integer frequency offset f̂$_I$ and the estimate for the frame start, i. e. a maximizing integer time offset T̂$_{sy}$ can be calculated according to equation (2) above, as explained in connection with the argmax step S7.

It should be mentioned that the method presented here profits from boosted pilots as e. g. implemented in Digital Radio Mondiale DRM, but this is not necessary.

In order to prevent misunderstandings, it should be clarified that in FIG. 3 prior to performing the inventive method, it is not yet known, which received cells are received pilot cells REC-PC and which received cells are received data cells. REC-DC. However, in order to better be able to explain the invention, in FIG. 3 certain received cells are shown as received pilot cells REC-DC and certain received cells are shown as received data cells REF-DC.

Figure 4:
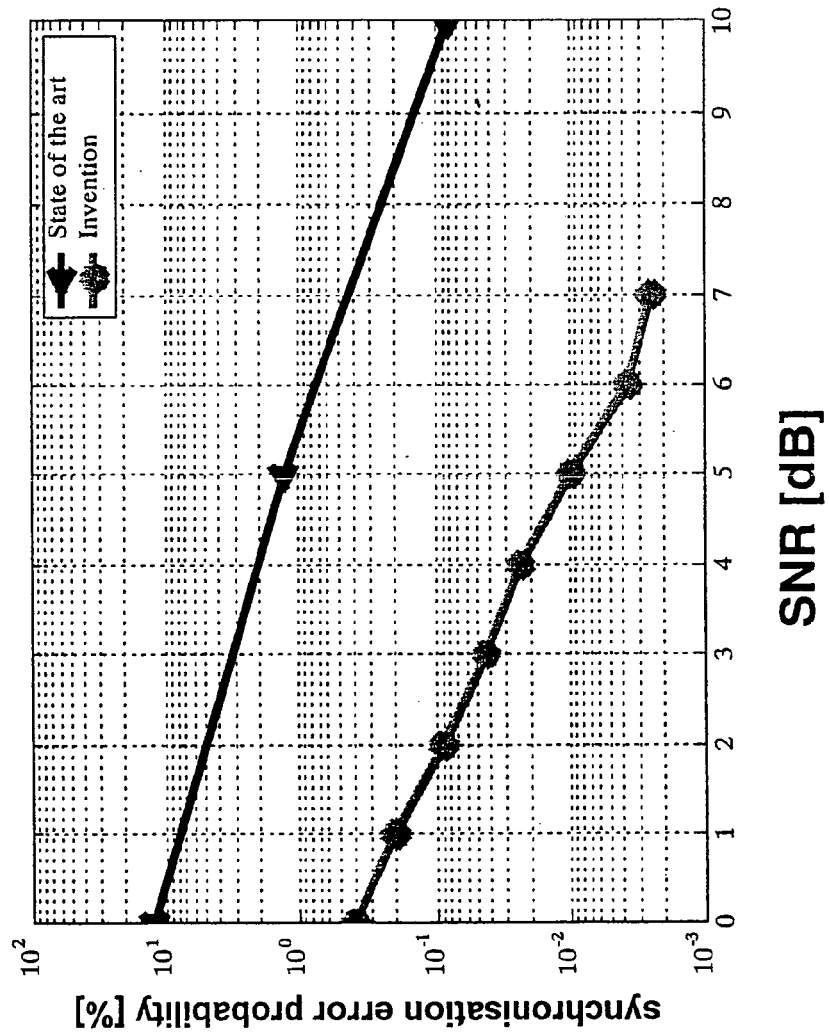
FIG. 4 shows a comparison of error rates achieved with the inventive method and with a prior art method.

FIG. 4 shows the rate for false synchronization, i. e. the synchronization error rate, achieved with the invention and the rate for false synchronization achieved with a state of a art method disclosed in "Frame and frequency synchronization for Concrete OFDM-Systems Based on Pilots with Pseudorandom Phase" by Christian Hansen, et al., in International OFDM-Workshop, Hamburg, 2001, for different signal-to-noise ratios SNR. It should be noted that FIG. 4 does not show bit error rates. The rates for false synchronization shown in FIG. 4 are the results of a simulation for a two-path Rayleigh fading channel and for an OFDM system with the following parameters:

DRM Channel-4:
  Path-1: path delay τ$_1$=0 ms, gain=1, Doppler spread f$_{d,sp}$=1 Hz
  Path-2: path delay τ$_2$=2 ms, gain=1, Doppler spread f$_{d,sp}$=1 Hz DRM Mode-B:
  Number of sub-carriers per OFDM symbol K=206
  Distance between pilots in frequency direction N$_k$=6
  Distance between pilots in time direction N$_l$=3
  OFDM frame length N$_{sy}$=15
  Sub-carrier spacing $$\frac{1}{T_u} = 46\frac{7}{8} \text{ Hz}$$

Symbol length $$T_s = 26\frac{2}{3} \text{ ms}$$

a Boost factor for the pilots A=sqrt(2)

For the experiments in FIG. 4, the phase of the pilots are chosen according to the DRM standard ETSI-ES 201980.

In FIG. 4, the results for the state of the art method are denoted with small triangles and the results for the inventive method are denoted with small dots. As can be seen in FIG. 4, the probability for false synchronization for the state of the art method is higher than for the inventive method for all signal-to-noise ratios SNR, which are given in dB units. This means, the quality of post-FFT synchronization of the invention is much higher than for the state of the art method.

FIG. 4 shows the drastic improvement that is achieved with the invention, wherein the probability for a wrong synchronization decreases by a factor of up to 100. In other words, the rate for false synchronization that can be achieved with the invention in comparison with prior art methods is about 40-100 times smaller compared to the state of the art.

The following considerations may illustrate the different performance between the invention and the state of the art. Please note, that $N_{k'}$ in the following is the predetermined pilot cell frequency distance from above, i. e. the distance of neighbouring pilot cells in frequency direction.

For the above example of FIG. 4, i. e.

$$\left(N_{k'} = 6, \tau_2 = 2 \text{ ms and } \frac{1}{T_u} = 46\frac{7}{8} \text{ Hz}\right),$$

a characteristic parameter, which may be seen as an inverse sampling factor, wherein a correlation along the frequency direction is done, can be calculated as follows; for the state of the art method $$\tau_{max} \cdot \frac{1}{T_u} \cdot N_{k'} = 2\text{ms} \cdot 46\frac{7}{8} \text{ Hz} \cdot 6 = 0{,}5625$$

A similar parameter for the invention, thereby correlating along the time direction, can be calculated for the parameters of the above example, i. e. ($f_{d,sp}=1$ Hz, $T_s=26\frac{2}{3}$ ms and $N_l=3$), as follows:

$$f_{d,sp} \cdot T_s \cdot N_l = 1 \text{ Hz} \cdot 26\frac{2}{3} \text{ ms} \cdot 3 = 0{,}08$$

As known from channel estimation theory [P. Hoeher, S. Kaiser, P. Robertson: "Two-Dimensional Pilot-Symbol-Aided Channel Estimation by Wiener Filtering", DLR Oberpfaffenhofen, April 1997], these values should be well below ½ to cope with the effects introduced by the channel, otherwise the performance decreases.

This can be explained by the fact that the sampling of the channel transfer function in time direction, in the above description index 1, fulfills the Nyquist sampling theorem. On the other hand, the pilots within one symbol can represent only a sub-sampled version of the channel transfer function.

After the integer frequency offset and integer time offset have been determined as described above, it is possible to determine a remaining fractional frequency error in frequency domain. This remaining fractional frequency error may result from an inaccurate fractional frequency offset determination in the pre-processing step S2. In other words, with the method presented in the following, it is possible to determine a remaining fractional frequency error precisely and thus improve the frequency offset compensation of said OFDM signal in time domain. It should be noted that it is not necessary to use the above described method in order to determine the integer frequency offset and the integer time offset. The integer frequency offset and the integer time offset may be determined differently, e. g. with any prior art method such as e. g. the method disclosed in "Frame and Freqency Synchronization for Concrete OFDM-Systems Based on Pilots with Pseudorandom Phase" by Christian Hansen, et al., in International OFDM-Workshop, Hamburg, 2001.

Figure 5:
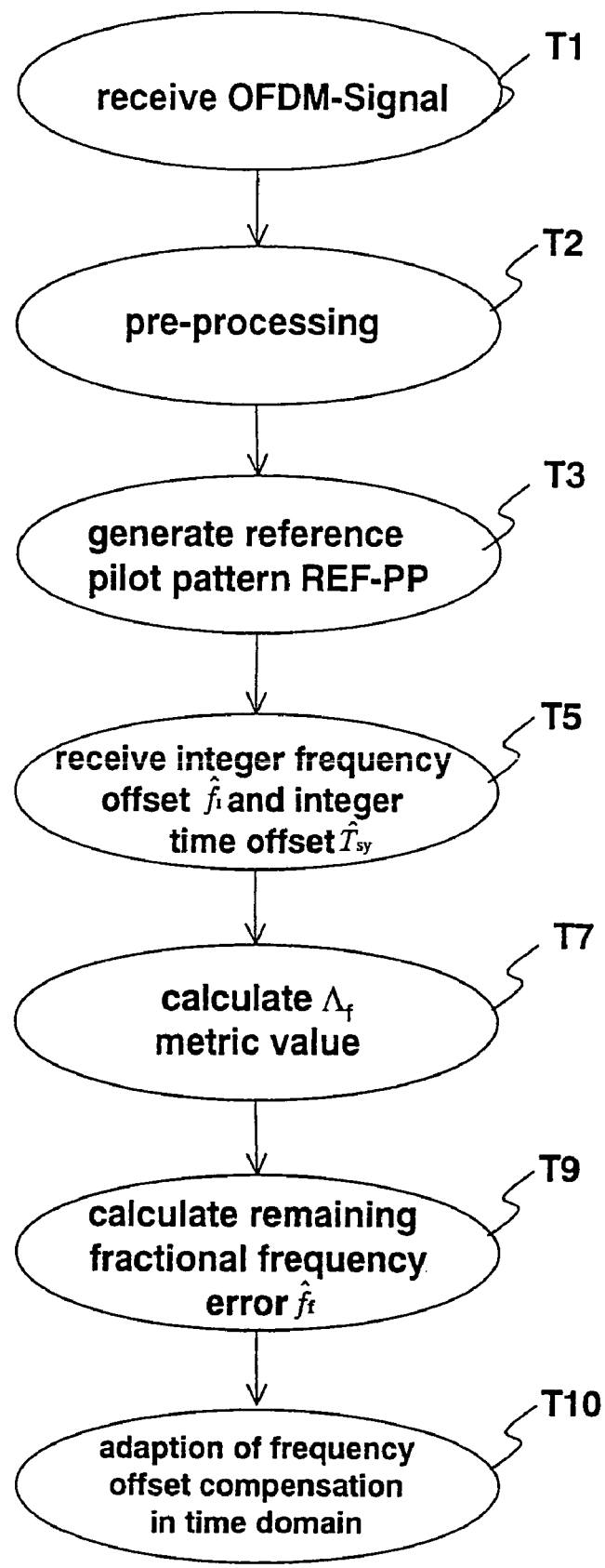
FIG. 5 shows a block diagram for determining a remaining fractional frequency error.

FIG. 5 shows the main steps for determining a remaining fractional frequency error $\hat{f}_f$. In a receiving step T1, an OFDM signal is received in time domain. Then, a pre-processing step T2 follows, wherein the same steps as above in the pre-processing step S2 are performed. Then, in a reference pilot pattern generation step T3, a reference pilot pattern REF-PP is determined. After this reference pilot pattern generation step T3, a second receiving step T5 follows, wherein an integer frequency offset $\hat{f}_I$ and an integer time offset $\hat{T}_{sy}$ are received. It should be noted that the integer frequency offset $\hat{f}_I$ and the integer time offset $\hat{T}_{sy}$ may also be calculated as explained above. However, in this embodiment the integer frequency offset $\hat{f}_I$ and the integer time offset $\hat{T}_{sy}$ are received and thus determined differently. Then follows a second calculation step T7, wherein a metric value $\Lambda_f$ is calculated. $\Lambda_f$ is calculated with Eq. (3) above, wherein $x=\hat{f}_I$ and $y=\hat{T}_{sy}$, i.e.

$$\Lambda_f = \Lambda(x=\hat{f}_I, y=\hat{T}_{sy})$$

This means a given arrangement XY corresponding to an integer frequency offset $\hat{f}_I$ and an integer time offset $\hat{T}_{sy}$ between the reference pilot pattern REF-PP and the received pilot pattern REC-PP is used and the metric value $\Lambda$ is calculated for that arrangement.

Then, in a third calculation step T9, a remaining fractional frequency error $\hat{f}_f$ is calculated based on the metric value $\Lambda_f$ that was calculated in the second calculation step T7. Then follows an adaptation step T10, in which the remaining fractional frequency error $\hat{f}_f$ is used for adaptation of the frequency offset compensation in time domain. This means, the remaining fractional frequency error $\hat{f}_f$ is used to improve the frequency offset compensation in time domain. It should be noted that the adaptation of frequency offset compensation in time domain relates to the pre-processing which is done in the pre-processing step T2. In a different embodiment not shown in FIG. 5, it may also be possible to use the remaining fractional frequency error $\hat{f}_f$ within the pre-processing step T2, i. e. the adaptation step T10 is included into the pre-processing step T2. This way a closed loop is realized wherein the frequency offset compensation may be adapted during the decoding procedure of the OFDM signal.

It should be clearly understood, that the method described for determining the remaining fractional frequency offset $\hat{f}_f$ may be performed independently of the above-explained method to determine an integer frequency offset $\hat{f}_I$ and an integer time offset $\hat{T}_{sy}$.

In the following, it is explained how the remaining fractional frequency error $\hat{f}_f$ is calculated from the received integer frequency offset $\hat{f}_I$ and the received integer time offset $\hat{T}_{sy}$ and the metric value $\Lambda_f$.

The effects of an integer frequency offset $f_I$ in frequency domain are described in the following.

If there is a frequency offset of $f_{off}=1T_u$, this is equal to an integer frequency offset of $f_I=1$. This means, the frequency is shifted by one sub-carrier spacing $1/T_u$. In the time domain an integer frequency offset $f_I$, normalized to $1/T_u$ produces a constant growing phase $$\varphi_{off,u}(t) = 2\pi \cdot f_I \cdot \frac{t}{T_u} \quad (4)$$

which results in $$\varphi_{off,u}(T_u) = 2\pi \cdot f_I \cdot \frac{T_u}{T_u} = 2\pi \cdot f_I \quad (5)$$

over the length of the useful part $T_u$ of an OFDM symbol. The useful part $T_u$ is shown in FIG. 5. Between two consecutive symbols, i. e. after the transmission time for one OFDM symbol $T_s$, the phase difference is $$\varphi_{off,i}(T_s) = 2\pi \cdot f_I \cdot \frac{T_s}{T_u} = 2\pi \cdot f_I \cdot \frac{T_g + T_u}{T_u} = \varphi_{off,u} + 2\pi \cdot f_I \cdot \frac{T_g}{T_u} \quad (6)$$

With respect to Eq. (6), it should be noted that $\phi_{off,u}$ is a multiple of $2\pi$ and is therefore not visible.

In the following, the effects of a remaining fractional frequency error $f_f$ in frequency domain are explained. In the presence of a remaining fractional frequency error $f_f$, the offset between two consecutive OFDM symbols becomes:

$$\phi_{off,f}(T_s) = 2\pi \cdot f_f \cdot T_s \quad (7)$$

It should be noted, that the remaining fractional frequency error $f_f$ is given in units of [Hz].

In the following, it is explained how the remaining fractional frequency error can be calculated with the help of equation (6) and equation (7).

The angle of the gain-pilot correlation can be used to estimate the remaining fractional frequency offset $\hat{f}_f$ and Doppler-shift. If there is no remaining fractional frequency error, the correlation result, i. e. the metric value $\Lambda_f$ is a real value. However, if there is a remaining fractional frequency error, the metric value $\Lambda_f$ becomes complex. Using the metric value $\Lambda_f$, which is the correlation over all gain-pilots, i. e. over all pilots, the received integer frequency offset $\hat{f}_I$ and the received integer time offset $\hat{T}_{sy}$, i. e. the determined frame start, an estimate for the remaining fractional frequency error $\hat{f}_f$ can be calculated with the following equation:

$$\hat{f}_f = \frac{-1}{T_s \cdot N_l \cdot 2\pi} \cdot \angle\left(\Lambda_f \cdot e^{j 2\pi \cdot \hat{f}_f \cdot N_l \cdot T_g / T_u}\right) \quad (8)$$

To get a better understanding of Eq. (8), it should be noted that Eq. (6) results in the following Equation for OFDM symbols which are separated by $N_l$ discrete time steps:

$$\varphi_{off,i}(N_l T_s) = N_l \cdot \varphi_{off,u} + 2\pi \cdot f_I \cdot N_l \cdot \frac{T_g}{T_u} \quad (9)$$

Further, in the case of OFDM symbols which are $N_l$ discrete time steps apart, Eq. (7) may be written as $$\phi_{off,f}(N_l T_s) = 2\pi \cdot f_f \cdot N_l \cdot T_s \quad (10)$$

A total phase offset $\phi_{off,total}$ is given by adding Eq. (9) and Eq. (10):

$$\varphi_{off,total} = 2\pi \cdot f_I \cdot N_l \cdot \frac{T_g}{T_u} + 2\pi \cdot f_f \cdot N_l \cdot T_s \quad (11)$$

The phase error of the integer frequency offset $f_I$ contained within $\Lambda_f$ may be calculated by multiplying with the exponential of the received integer frequency offset $\hat{f}_I$, which results in the negative value of the phase offset from the remaining fractional frequency error $f_f$:

$$-\varphi_{off,f} = \angle\left(\Lambda_f \cdot e^{j 2\pi \cdot \hat{f}_I \cdot N_l \cdot T_g / T_u}\right) \quad (12)$$

Solving Eq. (12) together with Eq. (10) results in Eq. (8) for calculating the remaining fractional frequency error $\hat{f}_f$.

Note that the negative sign of $-\phi_{off,f}$ in Eq. (12) results from using the conjugate complex value R* in Eq. (1) and Eq. (3). From Eq. (1) and Eq. (3) it may also be remarked that $\phi_{off,f}$ is caused by the phase difference between two neighboring pilot cells spaced $N_l$ cells apart.

Figure 6:
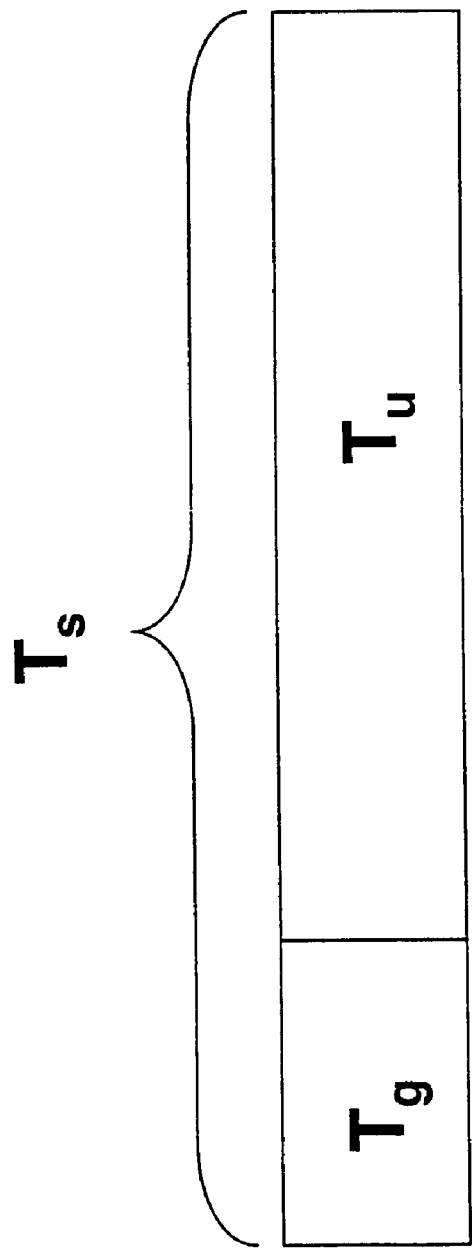
FIG. 6 shows an OFDM symbol in time domain.

FIG. 6 shows an OFDM symbol in time domain having a time length $T_s$, and comprising a guard interval $T_g$ and the useful part $T_u$.

REFERENCE SYMBOLS $\angle\{z\}$ angle i. e. argument of complex number z
$f_I$ integer frequency offset
$\hat{f}_I$ maximizing/received integer frequency offset
k frequency index
l time index
$N_{k'}$ predetermined pilot cell frequency distance
$N_l$ predetermined pilot cell time difference
$N_{sy}$ number of OFDM symbols in one OFDM frame
REC-DC received data cell
REC-PC received pilot cell
REC-PP received pilot pattern
REF-PC-PAIR pair of reference pilot cells
REF-PP reference pilot pattern
S1,T1 receiving step
S2,T2 pre-processing step
S3,T3 reference pilot pattern generation step
S4 arrangement generating step
S5 first calculation step
T5 second receiving step
S6 loop exiting step
S7 argmax step
S8 compensation step
T7 second calculation step
T9 third calculation step
T10 adaptation step
S-PP sent pilot pattern
$\hat{T}_{sy}$ maximizing integer time offset
$T_{sy}$ integer time offset
X offset between REC-PP and REF-PP in frequency direction
XY arrangement of received/reference pilot pattern
y offset between REC-PP and REF-PP in time direction
$\Lambda(x, y)$ metric value for an arrangement

The invention claimed is:

1. Method for processing an OFDM (Orthogonal Frequency Division Multiplex)-signal comprising the following steps:

receiving (S1) an OFDM signal comprising received cells (REC-PC, REC-DC), each received cell (REC-PC, REC-DC) corresponding to a discrete frequency (k) and to a discrete time (l), wherein each of said received cells (REC-PC, REC-DC) is a received pilot cell (REC-PC) or a received data cell (REC-DC), said received pilot cells (REC-PC) corresponding to a received pilot pattern (REC-PP) of an OFDM-frame, providing and/or generating (S3) a reference pilot pattern (REF-PP) of reference pilot cells (REF-PC) each reference pilot cell (REF-PC) corresponding to a discrete frequency (k) and to a discrete time (l), generating (S4) at least one arrangement (XY) between said received pilot pattern (REC-PP) and said reference pilot pattern (REF-PP), each arrangement (XY) corresponding to an integer frequency offset ($f_I$) and an integer time offset ($T_{sy}$) between said received pilot pattern (REC-PP) and said reference pilot pattern (REF-PP), calculating (S5) a metric value ($\Lambda$) for each arrangement of said at least one arrangement (XY), determining the maximum value of said metric values ($\Lambda$) and the respective maximizing arrangement, determining (S7) a maximizing integer frequency offset ($\hat{f}_I$) and a maximizing integer time offset ($\hat{T}_{sy}$) corresponding to the integer frequency offset and the integer time offset of the maximizing arrangement, using said maximizing integer frequency offset ($\hat{f}_I$) and/or said maximizing integer time offset ($\hat{T}_{sy}$) for frequency offset compensation and/or time offset compensation (S8) of said OFDM-signal, wherein the calculation of said metric values ($\Lambda$) is based on the evaluation of groups (REF-PC-PAIR (P,(k, l); P(k, l+N$_l$))) of reference pilot cells (REF-PC), wherein at least two members of said groups (REF-PC-PAIR (P,(k, l); P(k, l+N$_l$))) correspond to the same discrete frequency (k) and to different discrete times (l), and based on the signals (R(k, l), R(k, l+N$_l$)) of corresponding received cells (REC-PC, REC-DC) with respect to said discrete frequencies (k) and said discrete times (l).

2. Method according to claim 1, characterized by calculating a remaining fractional frequency error ($\hat{f}_f$), wherein the calculation (T9) of said remaining fractional frequency error ($\hat{f}_f$) is based on said metric value ($\Lambda$).

3. Method according to claim 2, characterized by using said remaining fractional frequency error ($\hat{f}_f$) for an adaptation of a frequency offset compensation in time domain (T2, T10).

4. Method according to claim 2, characterized in that said calculation of said remaining fractional frequency error ($\hat{f}_f$) is based on the formula $$\hat{f}_f = \frac{-1}{T_s \cdot N_l \cdot 2\pi} \cdot \angle\{\Lambda \cdot e^{+j 2\pi \cdot \hat{f}_I \cdot N_l T_g / T_u}\}$$

wherein $\Lambda$ denotes said metric value, $T_s$ denotes the length of time of an OFDM symbol, $N_l$ denotes a predetermined pilot cell time difference, which is the time distance between two neighboring reference pilot cells of said reference pilot pattern in time direction, $\hat{f}_I$ denotes said integer frequency offset, $T_g$ denotes the length of time of a guard interval of said OFDM symbol, $T_u$ denotes length of time of a useful part of said OFDM symbol, and $\angle\{z\}$ denotes the argument, i. e. the angle, of the complex number z.

5. Method according to claim 1, characterized in that, said groups are pairs (REF-PC-PAIR (P,(k, l); P(k, l+N$_l$))) of reference pilot cells (REF-PC), the members of said pairs (REF-PC-PAR (P,(k, l); P(k, l+N$_l$))) corresponding to the same discrete frequency (k) and to different discrete times (l).

6. Method according to claim 1, characterized in that, said first and second members of said pairs (REC-PC-PAIR (P,(k, l); P(k, l+N$_l$))) are in each case temporally separated by a predetermined pilot cell time distance (N$_l$).

7. Method for processing an OFDM (Orthogonal Frequency Division Multiplex) signal comprising the following steps:

receiving (T1) an OFDM signal comprising received cells (REC-PC, REC-DC), each received cell (REC-PC, REC-DC) corresponding to a discrete frequency (k) and to a discrete time (l), wherein each of said received cells (REC-PC, REC-DC) is a received pilot cell (REC-PC) or a received data cell (REC-DC), said received pilot cells (REC-PC) corresponding to a received pilot pattern (REC-PP) of an OFDM-frame, providing and/or generating (T3) a reference pilot pattern (REF-PP) of reference pilot cells (REF-PC), each reference pilot cell (REF-PC) corresponding to a discrete frequency (k) and to a discrete time (l), receiving, providing, and/or computing an integer frequency offset ($\hat{f}_I$) and an integer time offset ($\hat{T}_{sy}$), receiving, providing, and/or computing a metric value ($\Lambda$) based on said received pilot pattern (REC-PP) and said reference pilot pattern (REF-PP), which metric value ($\Lambda$) depends on said integer frequency offset ($\hat{f}_I$), and said integer time offset ($\hat{T}_{sy}$) between said received pilot pattern (REC-PP) and said reference pilot pattern (REF-PP), calculating a remaining fractional frequency error ($\hat{f}_f$), wherein the calculation of said remaining fractional frequency error ($\hat{f}_f$) is based on said metric value ($\Lambda$).

8. Method according to claim 7, characterized by using said remaining fractional frequency error ($\hat{f}_f$) for an adaptation of a frequency offset compensation in time domain (T2, T10).

9. Method according to claim 7, characterized in that said calculation of said remaining fractional frequency error ($\hat{f}_f$) is based on the formula $$\hat{f}_f = \frac{-1}{T_s \cdot N_l \cdot 2\pi} \cdot \angle\{\Lambda \cdot e^{+j 2\pi \cdot \hat{f}_I \cdot N_l T_g / T_u}\}$$

wherein $\Lambda$ denotes said metric value, $T_s$ denotes the length of time of an OFDM symbol, N_l denotes a predetermined pilot cell time difference, which is the time distance between two neighboring reference pilot cells of said reference pilot pattern in time direction, f_I denotes said integer frequency offset, T_g denotes the length of time of a guard interval of said OFDM symbol, T_u denotes length of time of a useful part of said OFDM symbol, and ∠{z} denotes the argument, i. e. the angle, of the complex number z.

10. Method according to claim 1, characterized in that, said calculation (S5, T5) of said metric values (Λ) is based on correlation techniques.

11. Method according to claim 1, characterized in that, said calculation (S5, T5) of said metric values (Λ) is based on products of said corresponding signals (R(k, l)) of received cells (REC-PC, REC-DC) and/or its conjugate complex values (R*(k, l+N_l)).

12. Method according claim 1, characterized in that, said calculation (S5, T5) of said metric values (Λ) is based on products of exponential values of phase differences of reference pilot cells (REF-PC) of said groups (REF-PC-PAIR (P,(k, l); P(k, l+N_l))).

13. Method according to claim 1, characterized in that, said calculation (S5, T5) of said metric values (Λ) is based on a process of summation over at least two groups (REF-PC-PAIR (P,(k, l); P(k, l+N_l))) of reference pilot cells (REF-PC) within said reference pilot pattern (REF-PP).

14. Method according to claim 1, characterized in that, said calculation (S5, T5) of said metric values (Λ) is based on a process of summation over selected groups of reference pilot cells (REF-PC) within said reference pilot pattern (REF-PP), which groups are selected according to a selection criterion.

15. Method according to claim 14, characterized in that, said selection criterion assures that only groups are chosen containing reference pilot cells (REF-PC) of said reference pilot pattern (REF-PP), which reference pilot cells (REF-PC) correspond to received cells (REC-PC; REC-DC) that have been received before a certain discrete time (l).

16. Method according to claim 14, characterized in that, said selection criterion assures that only groups are chosen containing reference pilot cells (REF-PC) of said reference pilot pattern (REF-PP), which reference pilot cells (REF-PC) correspond to received cells (REC-PC; REC-DC) that correspond to discrete frequencies, at which a transmission channel has good transmission properties.

17. Method according to claim 1, characterized in that, said calculation (S5, T5) of said metric values (Λ) is based on a process of summation over all groups, in particular over all pairs (REF-PC-PAIR (P,(k, l); P(k, l+N_l))), of reference pilot cells (REF-PC) within said reference pilot pattern (REF-PP).

18. Method according to claim 1, characterized in that, said metric value is calculated (S5, T5) by using the formula $$\Lambda = \sum_{\forall (k,l) \in \Gamma} R(k, l) \cdot R^*(k, l+N_l) \cdot \exp(j \cdot 2\pi \cdot (\angle\{P(k, l+N_l)\} - \angle\{P(k, l)\}))$$

wherein

R(k, l) denotes a signal of a received cell at discrete frequency k and discrete time l, R*(k, l+N_l) denotes a conjugate complex signal corresponding to a signal of a received cell at discrete frequency k and discrete time (l+N_l)

P(k, l) denotes a signal of reference pilot cell at discrete frequency k and discrete time l, P(k, l+N_l) denotes a signal of reference pilot cell at discrete frequency k and discrete time (l+N_l), Γ is the set of couples (k, l) of all discrete frequencies and all discrete times of said reference pilot pattern, ∠{z} denotes the angle of the complex number z, and N_l denotes the predetermined pilot cell time difference.

19. Method according to claim 1, characterized in that, said metric value is calculated (S5, T5) by using the formula $$\Lambda(x, y) = \sum_{\forall (k-x,(l-y) \bmod N_{sy}) \in \Gamma} [R(k, l) \cdot R^*(k, l+N_l) \cdot \exp(j \cdot 2\pi \cdot (\angle\{P(k-x, (l+N_l-y) \bmod N_{sy})\} - \angle\{P(k-x, (l-y) \bmod N_{sy})\}))]$$

wherein

R(k, l) denotes a signal of a received cell at discrete frequency k and discrete time l, R*(k, l+N_l) denotes a conjugate complex signal corresponding to a signal of a received cell at discrete frequency k and discrete time (l+N_l)

P(k, l) denotes a signal of reference pilot cell at discrete frequency k and discrete time l, P(k, l+N_l) denotes a signal of reference pilot cell at discrete frequency k and discrete time (l+N_l), Γ is the set of couples (k, l) of all discrete frequencies and all discrete times of said reference pilot pattern, ∠{z} denotes the angle of the complex number z, N_l denotes the predetermined pilot cell time difference, N_{sy} denotes the number of OFDM symbols in one OFDM frame, x denotes said integer frequency offset between said received pilot pattern (REC-PP) and said reference pilot pattern (REF-PP), y denotes said integer time offset between said received pilot pattern (REC-PP) and said reference pilot pattern (REF-PP), and mod denotes the modulo operator.

20. Method according to claim 1, characterized in that, said received OFDM signal is subjected to a pre-processing method, wherein a fractional frequency offset and a fractional time offset is determined.

21. Method according to claim 20, characterized in that, said pre-processing method (S2) is based on an auto-correlation of said received OFDM signal in the time domain.

22. Method according to claim 1, characterized in that, said received pilot cells (REC-PC) correspond to boosted pilot cells.

23. A receiver for performing or realizing a method for processing an OFDM signal according to claim 1 and/or the steps thereof, in particular according to the Digital Radio Mondiale (DRM) standard, the Digital Video Broadcasting-Terrestrial (DVB-T) standard, the Integrated Services Digital Broadcasting-Terrestrial (ISDB-T) standard.

24. Signal processing system, for realizing a method for processing an OFDM signal according to claim 1 and/or the steps thereof.

25. Signal processing system according to claim 24, comprising or based on an Application-Specific Integrated Circuit (ASIC), a Field Programmable Gate Array (FPGA).

26. Computer program product, comprising computer program means adapted to perform and/or to realize the method for processing an OFDM signal according to claim 1 and/or the steps thereof when it is executed on a computer, a digital signal processing means.

27. Computer readable storage medium, comprising a computer program product according to claim 26.

* * * * *